(12) United States Patent
Minami et al.

(10) Patent No.: US 7,048,194 B2
(45) Date of Patent: May 23, 2006

(54) PRINTING PAPER WITH MEMORY ELEMENT MOUNTED THEREON AND PRINTING TECHNIQUE USING SUCH PRINTING PAPER

(75) Inventors: Toshiyasu Minami, Nagano-ken (JP); Hiroto Nakamura, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 37 days.

(21) Appl. No.: 10/400,059

(22) Filed: Mar. 27, 2003

(65) Prior Publication Data

US 2004/0099742 A1 May 27, 2004

(30) Foreign Application Priority Data

Mar. 27, 2002 (JP) .............................. 2002-089347
Mar. 27, 2002 (JP) .............................. 2002-089348

(51) Int. Cl.
*G06K 19/06* (2006.01)
(52) U.S. Cl. ....................................... 235/492; 235/487
(58) Field of Classification Search ................ 235/492, 235/487, 476, 375, 383, 385
See application file for complete search history.

(56) References Cited

U.S. PATENT DOCUMENTS

| | | | |
|---|---|---|---|
| 5,852,391 A * | 12/1998 | Watanabe et al. ........... 333/246 |
| 6,134,695 A * | 10/2000 | Sasaki et al. ............... 714/752 |
| 6,249,226 B1 * | 6/2001 | Harrison et al. ......... 340/572.1 |
| 6,386,671 B1 * | 5/2002 | Huston et al. ................ 347/16 |
| 6,585,154 B1 * | 7/2003 | Ostrover et al. ............ 235/375 |
| 6,702,419 B1 * | 3/2004 | Stoessel et al. ............... 347/19 |
| 6,827,279 B1 * | 12/2004 | Teraura ...................... 235/492 |
| 6,837,559 B1 * | 1/2005 | Nunokawa ...................... 347/5 |
| 2002/0170973 A1 * | 11/2002 | Teraura ....................... 235/492 |
| 2004/0046985 A1 * | 3/2004 | Watanabe et al. .......... 358/1.13 |
| 2004/0188512 A1 * | 9/2004 | Ikeda ......................... 235/375 |
| 2004/0196485 A1 * | 10/2004 | Hikichi et al. ............. 358/1.13 |
| 2004/0257601 A1 * | 12/2004 | Tomiyasu et al. ............ 358/1.9 |
| 2005/0024393 A1 * | 2/2005 | Kondo et al. .................. 347/2 |
| 2005/0175259 A1 * | 8/2005 | Takenouchi ................. 382/305 |

FOREIGN PATENT DOCUMENTS

| | | | |
|---|---|---|---|
| JP | 01-141775 A | | 6/1989 |
| JP | 11-010853 A | | 1/1999 |
| JP | 2000066350 A | * | 3/2000 |
| JP | 2000112354 A | * | 4/2000 |
| JP | 2000-285203 A | | 10/2000 |

(Continued)

*Primary Examiner*—Thien M. Le
*Assistant Examiner*—Edwyn Labaze
(74) *Attorney, Agent, or Firm*—Sughrue Mion, PLLC (57) ABSTRACT

A printing paper 70 has memory elements 80 arranged on an upper left corner and a lower right corner on the surface thereof. Each of the memory elements 80 stores printing information used for printing, such as a paper size and a paper type, and transmits the printing information by radio wave, when receiving radio wave of a preset wavelength. A printer 20 has two information collection units 50 attached to a left end and a right end on a rear side of a carriage mechanism 30. Each of the information collection units 50 transmits the radio wave of the preset wavelength and receives the printing information transmitted from the memory element 80 in response to reception of this transmitted radio wave. The printing paper 70 is set in the printer 20 and is used for printing. The printer 20 carries out printing with settings of a paper size, a paper type, and a paper direction, based on the printing information received by the information collection unit 50.

34 Claims, 9 Drawing Sheets

FOREIGN PATENT DOCUMENTS

| | | |
|---|---|---|
| JP | 2000-296653 A | 10/2000 |
| JP | 2001-058486 A | 3/2001 |
| JP | 2002-072882 A | 3/2002 |
| JP | 2003-096696 A | 4/2003 |
| JP | 2004066692 A * | 3/2004 |
| WO | WO 00/36555 A1 | 6/2000 |

* cited by examiner

PRINTING PAPER WITH MEMORY ELEMENT MOUNTED THEREON AND PRINTING TECHNIQUE USING SUCH PRINTING PAPER

BACKGROUND OF THE INVENTION

1. Field of the Invention

The present invention relates to a printing paper with a memory element mounted thereon and a printing technique using such a printing paper. More specifically, the invention pertains to a printing paper used to print a printing object, such as letters, characters, symbols, and images, a method of manufacturing such a printing paper, a printing apparatus to print a printing object, such as letters, characters, symbols, and images on such a printing paper, and a corresponding printing method.

2. Description of the Prior Art

One proposed technique for a printing paper gives a mark for positioning at a predetermined position in a marginal space of the paper. A printer or another image forming apparatus reads the mark on the printing paper to check the position of the printing paper and thus attain printing at an adequate position.

The printing paper with the positioning mark, however, does not allow effective printing to be carried on the marked area. In the case of printing an image, especially in the case of rimless printing, the mark on the printing paper undesirably damages the picture quality. The mark may be given on the rear face of the printing paper by avoiding such problems. This technique is, however, not applicable to the case of printing on both faces of the printing paper.

One proposed technique of a printing apparatus allows for individual settings corresponding to each of diverse printing papers. A variety of printing papers have been developed to attain clear printing of images, photographs, and other printing objects. The printing apparatus uses printer driver installed therein to allow for individual settings corresponding to each of the diverse printing papers and attain clearer printing of such printing objects.

There are a large number of different types of printing papers developed, and individual settings for each of such diverse printing papers should be performed manually in the proposed printing apparatus. In some cases, the manual settings may not be adequate for the selected printing paper. Different manufacturers use different names for an identical type of printing papers. This may also cause different settings to be performed for the identical type of printing papers in the printing apparatus. This may result in insufficient exertion of the performances of the printing apparatus and the printing paper.

SUMMARY OF THE INVENTION

The object of the present invention is thus to cause information used for printing to be carried on a printing paper. The object of the present invention is also to prevent a printing surface of a printing paper from being damaged by recording information thereon. The object of the present invention is further to provide a method of manufacturing a printing paper with information used for printing carried thereon, as well as a method of manufacturing a printing paper that does not damage its printing surface by recording information thereon.

The object of the present invention is also to facilitate settings corresponding to each type of a printing paper in a printing apparatus and a corresponding printing method of the present invention. The object of the present invention is further to facilitate settings of a printing paper size and a printing paper direction in a printing apparatus and a corresponding printing method of the present invention. The object of the present invention is also to prevent multiple sheets of a printing paper from being overlapped.

In order to achieve at least a part of the aforementioned objects, a printing technique using memory element of the present invention is structured as follows.

A printing paper of the present invention is used for printing, the printing paper including: a memory element that is formed to a thin film of a predetermined thickness, is disposed on surface or inside of the printing paper, and stores printing information used for printing.

In the structure of the present invention, the memory element, which is formed to a thin film of a predetermined thickness and stores printing information used for printing, is disposed on the surface or inside the printing paper. This arrangement causes the information used for printing to be carried on the printing paper, while effectively preventing the printing surface of the printing paper from being damaged by recording the information.

In the printing paper of the present invention, the memory element may be arranged at a preset position of said printing paper, may be disposed on at least one of a lower right corner and an upper left corner on the surface of said printing paper, arranged at random on the surface of the printing paper, or may be interposed between the surface of said printing paper and a coating agent, which is used to coat the surface of said printing paper. Moreover, the printing information may include paper-related information regarding the printing paper or settings-related information regarding settings in a printing apparatus, which carries out printing with the printing paper. The memory element may includes: a storage module that stores the printing information, a reception module that receives a first transmission wave, a transmission module that transmits a second transmission wave, and a control module that has control to cause the printing information stored in the storage module to be carried on the second transmission wave and to be transmitted from the transmission module, in response to reception of the first transmission wave. In this case, the control module may have control to make the second transmission wave transmitted from the transmission module by utilizing energy of the received first transmission wave. In addition, the memory element may be formed to have a thickness of not greater than 0.2 mm or may be formed to a rectangular shape having each side of not greater than 0.5 mm.

A first method of manufacturing a printing paper of the present invention includes the steps of: (a) storing printing information, which is used for printing, into memory elements, each of which is formed to a thin film of a predetermined thickness;

(b) arranging said memory elements with the printing information stored therein at preset positions on a paper; and (c) coating surface of the paper with said memory elements arranged thereon.

The first manufacturing method of the printing paper in the present invention arranges the memory elements, each of which stores the printing information and is formed to a thin film of a predetermined thickness, at the preset positions and coats the surface of the printing paper with the memory elements. This method manufactures the printing paper, which has the printing information carried thereon and does not damage its printing surface by recording the information.

In the first manufacturing method of the present invention, there may be provided with the step of: cutting the coated paper into a predetermined shape according to the positions of said memory elements, after said step (c). Moreover, the step (a) may store the printing information into said memory elements, each of which includes: a storage module that stores the printing information, a reception module that receives a first transmission wave, a transmission module that transmits a second transmission wave, and a control module that has control to cause the printing information stored in the storage module to be carried on the second transmission wave and to be transmitted from the transmission module, in response to reception of the first transmission wave. Furthermore, the step (a) may store the printing information into said memory elements, each of which is formed to have a thickness of not greater than 0.2 mm. Alternatively, the step (a) may store the printing information into said memory elements, each of which is formed to a rectangular shape having each side of not greater than 0.5 mm.

A second method of manufacturing a printing paper of the present invention includes the steps of: (a) storing printing information, which is used for printing, into memory elements, each of which is formed to a thin film of a predetermined thickness; (b) dispersing said memory elements with the printing information stored therein into a coating agent; and (c) coating a paper with the coating agent of said dispersed memory elements.

The second manufacturing method of the printing paper in the present invention readily manufactures the printing paper with the memory elements arranged at random on the surface thereof, where each of the memory elements is formed to a thin film of a predetermined thickness and stores the printing information.

In the second manufacturing method of the present invention, the step (a) may store the printing information into said memory elements, each of which includes: a storage module that stores the printing information, a reception module that receives a first transmission wave, a transmission module that transmits a second transmission wave, and a control module that has control to cause the printing information stored in the storage module to be carried on the second transmission wave and to be transmitted from the transmission module, in response to reception of the first transmission wave. Moreover, the step (a) may store the printing information into said memory elements, each of which is formed to have a thickness of not greater than 0.2 mm. Further, the step (a) may store the printing information into said memory elements, each of which is formed to a rectangular shape having each side of not greater than 0.5 mm.

A printing apparatus of present invention prints a printing object including characters, letters, symbols, or an image on a printing paper, the printing apparatus including:

a feeding module that feeds said printing paper, which is set at a paper setting position, for printing; a printing information collection module that, while said printing paper having a memory element for storing printing information used for printing is fed by said feeding module, acquires the printing information from said memory element of said printing paper; and a printing module that prints the printing object on said printing paper, based on the acquired printing information.

While the printing paper with the memory element that stores the printing information used for printing is being fed, the printing apparatus of the present invention acquires the printing information from the memory element of the printing paper, and prints the printing object on the printing paper, based on the acquired printing information. This arrangement ensures printing adequate for the printing paper. Here, it is preferable that the memory element is formed to have a thickness of not greater than 0.2 mm or the memory element is formed to a rectangular shape having each side of not greater than 0.5 mm. In other case, it is preferable that the memory element is interposed between surface of said printing paper and a coating agent, which is used to coat the surface of said printing paper.

In the printing apparatus of the present invention structured in this way, the printing information may include paper-related information regarding the printing paper, and the printing module prints the printing object with settings required for printing, based on the paper-related information included in the acquired printing information. In this case, the printing paper may have said memory element arranged at a preset position, the paper-related information may include a paper size, the printing information collection module may detect the position of said memory element on said printing paper in the course of feeding and acquire the printing information from said detected memory element, and the printing module may print the printing object with settings of a size and a direction of said printing paper, based on the paper size and the detected position of said memory element on said printing paper in the course of feeding. In addition, the paper-related information may include a paper type, and the printing module may print the printing object with settings suitable for the paper type.

In the printing apparatus of the present invention, the printing information may include settings-related information regarding settings of said printing apparatus, and the printing module may print the printing object with settings required for printing, based on the settings-related information included in the acquired printing information.

The printing apparatus of this invention may further include: a specific output module that gives a specific output, when multiple pieces of the printing information are acquired simultaneously by said printing information collection module. In this case, the specific output module may give the specific output representing simultaneous feeding of multiple sheets of said printing paper.

Alternatively, in the printing apparatus of this invention, the memory element may include: a storage module that stores the printing information; a reception module that receives a first transmission wave; a transmission module that transmits a second transmission wave; and a control module that has control to cause the printing information stored in the storage module to be carried on the second transmission wave and to be transmitted from the transmission module, in response to reception of the first transmission wave, and the printing information collection module may include: a transmission module that transmits the first transmission wave; a reception module that receives the second transmission wave; and an analyzer module that analyzes the printing information carried on the received second transmission wave.

A printing method of the present invention print a printing object including characters, letters, symbols, or an image on a printing paper, the printing method including the steps of: (a) while said printing paper that has a memory element for storing printing information used for printing and is set at a paper setting position is fed for printing, acquiring the printing information from said memory element of said printing paper; and (b) printing the printing object on said printing paper, based on the acquired printing information.

While the printing paper with the memory element, which stores the printing information used for printing, is set at the paper setting position and is fed for printing, the printing method of the present invention acquires the printing information from the memory element of the printing paper and prints the printing object on the printing paper, based on the acquired printing information. This arrangement ensures printing adequate for the printing paper.

In the printing method of this invention, the printing information may include paper-related information regarding said printing paper, and the step (b) may print the printing object with settings required for printing, based on the paper-related information included in the acquired printing information. In this case, the printing paper may have the memory element arranged at a preset position, the paper-related information may include a paper size, the step (a) may detect the position of said memory element on said printing paper in the course of feeding, and the step (b) may print the printing object with settings of a size and a direction of said printing paper, based on the paper size and the detected position of said memory element on said printing paper in the course of feeding. In addition, the paper-related information may include a paper type, and the step (b) may print the printing object with settings suitable for the paper type.

Moreover, the printing method of this invention, the printing information may include settings-related information regarding settings of said printing apparatus, and the step (b) may print the printing object with settings required for printing, based on the settings-related information included in the acquired printing information. Further, the step (a) may give a specific output, when multiple pieces of the printing information are acquired simultaneously or the step (a) may give the specific output representing simultaneous feeding of multiple sheets of said printing paper.

DESCRIPTION OF THE PREFERRED EMBODIMENTS

Figure 1:
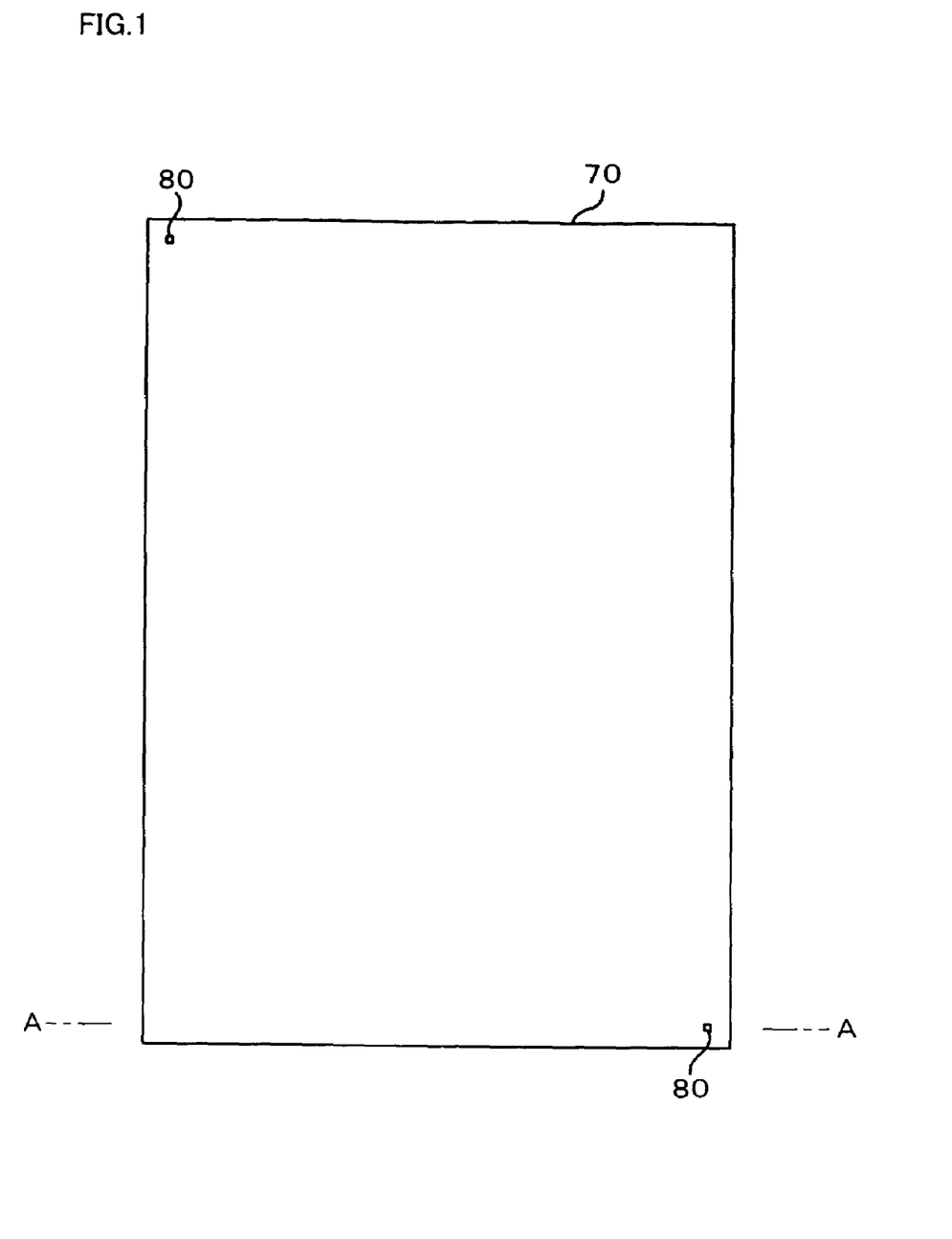
FIG. 1 schematically illustrates the structure of a printing paper 70 in one embodiment of the present invention.
Figure 2:
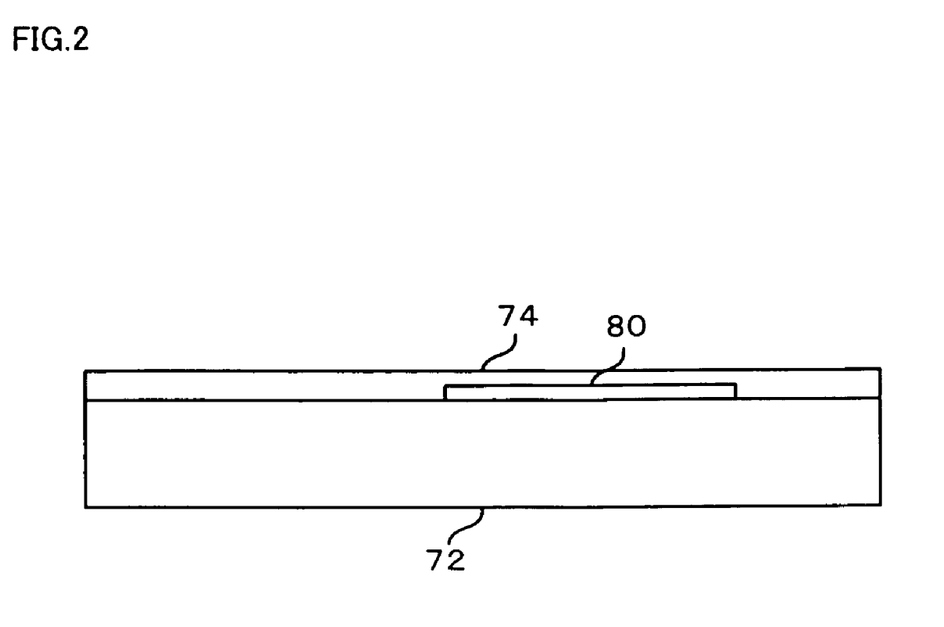
FIG. 2 is an enlarged sectional view showing a cross section taken on a line A—A on the lower right portion of the printing paper 70 of the embodiment shown in FIG. 1.

One preferred embodiment of the present invention is discussed below. FIG. 1 schematically illustrates the structure of a printing paper 70 in one embodiment of the present invention. FIG. 2 is an enlarged sectional view showing a cross section taken on a line A—A on the lower right portion of the printing paper 70 of the embodiment shown in FIG. 1. The printing paper 70 of the embodiment is formed to a preset standard size like an A-4 size or a B-4 size as shown in FIG. 1. As shown in FIGS. 1 and 2, thin-film memory elements 80 are attached to predetermined positions on an upper left corner and a lower right corner (for example, at positions 5 mm apart from the respective sides defining these corners) along the length of the printing paper 70, which is arranged with the surface up, by means of a coating agent 74 used for image printing.

Each of the memory elements 80 is a thin-film rectangular IC chip having a thickness of not greater than 0.2 mm or preferably not greater than 0.1 mm and each side of not greater than 0.5 mm or preferably not greater than 0.4 mm. One example of the memory element 80 is mu-chip (trade name) manufactured by Hitachi, Ltd. The small-sized thin-film memory elements 80 have little effects on the printing surface, compared with marks used for positioning and storage of information. The coating agent is applied on the surface of the memory elements 80 to allow for printing on the memory elements 80.

Figure 3:
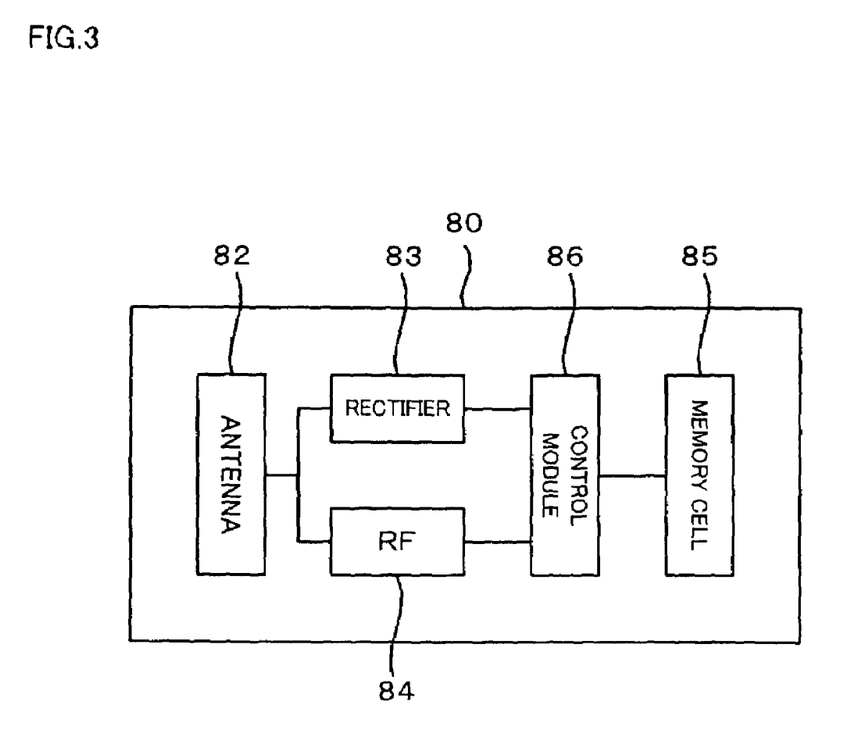
FIG. 3 is a block diagram showing the construction of the memory element 80 in the form of functional blocks.

FIG. 3 is a block diagram showing the construction of the memory element 80 in the form of functional blocks. As illustrated, the memory element 80 has an antenna 82 that transmits and receives signals by radio wave of a preset wavelength (for example, radio wave in a frequency band of 2.45 GHz), a rectifier 83 that rectifies the received radio wave and supplies the energy of the rectified radio wave as electric power, a signal analyzer RF (radio frequency) 84 that analyzes the received signal, a memory cell 85 that stores printing information used for printing, and a control module 86 that makes the printing information, which is stored in the memory cell 85, transmitted from the antenna 82 via the signal analyzer RF 84, when the signal received by the antenna 82 and analyzed by the signal analyzer RF 84 is a specified signal set to urge transmission of the printing information. The specified signal set to urge transmission of the printing information is carried on the radio wave and is output toward the memory elements 80. A printing apparatus receives the radio wave with the printing information carried thereon, which is transmitted from the memory element 80 via the antenna 82 in response to this specified signal, analyzes the received radio wave, and inputs the printing information, so as to acquire information used for printing with the printing paper 70. The memory cell 85 of this embodiment is constructed as a read only memory, so that the control module 86 only reads data from the memory cell 85, but does not write data into the memory cell 85.

The printing information includes paper-related information regarding, for example, the type and the size of the printing paper 70 and settings-related information regarding the settings in a predetermined printing apparatus that performs printing with the printing paper 70. The printing apparatus is accordingly required to have a transmission module that outputs the specified signal, which is set to urge transmission of the printing information, on the radio wave toward the memory elements 80, a reception module that receives the radio wave with the printing information carried thereon, which is transmitted from the memory element 80 via the antenna 82 in response to this specified signal, and an analyzer module that analyzes the received signal and inputs the printing information. Simple load of the printing paper 70 for the purpose of printing makes the printing information input from the memory element 80 of the printing paper 70 to set the printing apparatus. The printing apparatus can thus carry out printing with the settings optimum for the printing paper 70.

Figure 4:
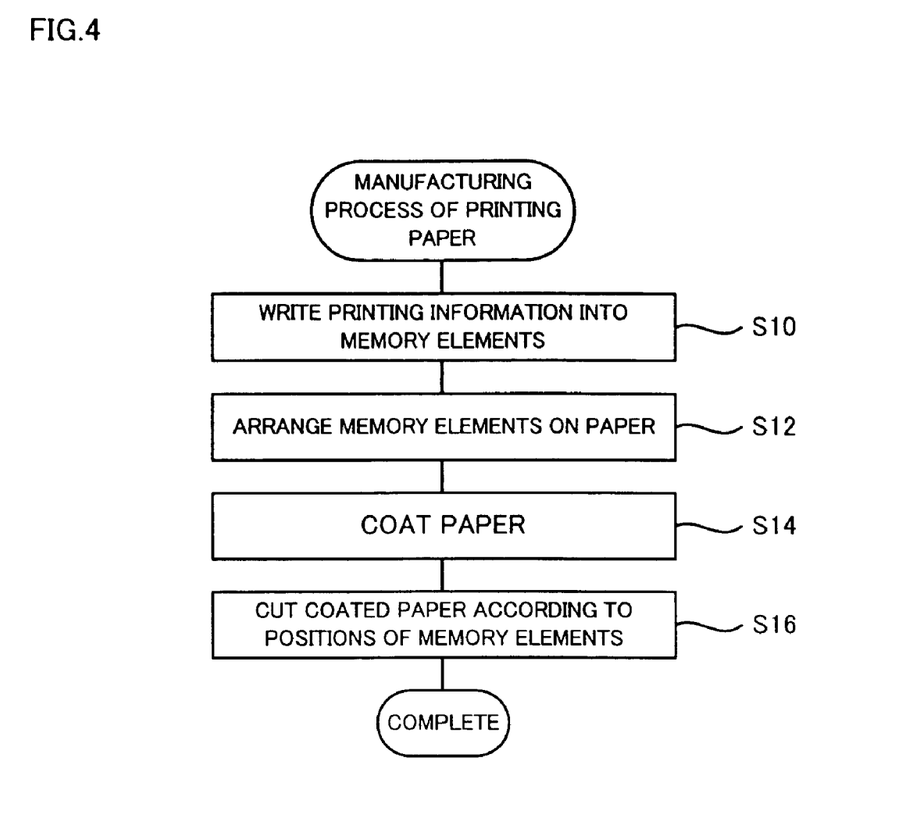
FIG. 4 is a flowchart showing one manufacturing process of the printing paper 70 in the embodiment.

The following describes a method of manufacturing the printing paper 70 in this embodiment. FIG. 4 is a flowchart showing one manufacturing process of the printing paper 70 in the embodiment. The manufacturing process of the printing paper 70 of the embodiment starts from a step of writing the printing information into the memory elements 80 (step S10). The procedure of this step may individually write the printing information into the produced memory elements 80 or may write the printing information in the course of producing the memory elements 80. The manufacturing process then arranges the memory elements 80 at predetermined intervals on a non-cut, continuous paper, for example, a roll paper (step S12). The interval of arranging the memory elements 80 is determined to make the memory elements 80 located on the upper left corner and the lower right corner in each preset size of the printing paper 70 to be manufactured. The manufacturing process subsequently coats the surface of the paper with the memory elements 80 arranged thereon with a coating agent (step S14). The coating fixes the memory elements 80 to the paper. The manufacturing process then cuts the paper to make the memory elements 80 located on the upper left corner and the lower right corner in each preset size of the printing paper (step S16). This completes the printing paper 70. In a preferable structure, a cutting machine used for the cutting has a transmitter that outputs the specified signal, which is set to urge transmission of the printing information, on the radio wave toward the memory elements 80 and a receiver that receives the radio wave with the printing information carried thereon, which is transmitted from the memory element 80 via the antenna 82 in response to this specified signal. The cutting machine detects the positions of the memory elements 80, based on the received signal. This arrangement ensures cutting at accurate positions.

The printing paper 70 of the embodiment discussed above has the printing information used for printing. Each of the memory elements 80 is constructed to transmit the printing information stored in the memory cell 85 from the antenna 82 via the signal analyzer RF 84, when the signal received by the antenna 82 and analyzed by the signal analyzer RF 84 is the specified signal set to urge transmission of the printing information. The printing apparatus can thus acquire the printing information by simply outputting the specified signal, which is set to urge transmission of the printing information, on the radio wave toward the memory elements 80. The printing information includes the paper-related information regarding, for example, the type and the size of the printing paper 70 and the settings-related information regarding the settings in a predetermined printing apparatus that performs printing with the printing paper 70. The printing apparatus has the transmission module that outputs the specified signal, which is set to urge transmission of the printing information, on the radio wave toward the memory elements 80, the reception module that receives the radio wave with the printing information carried thereon, which is transmitted from the memory element 80 via the antenna 82 in response to this specified signal, and the analyzer module that analyzes the received signal and inputs the printing information. Simple load of the printing paper 70 for the purpose of printing makes the printing information input from the memory element 80 of the printing paper 70 to set the printing apparatus. The printing apparatus can thus carry out printing with the settings optimum for the printing paper 70. The surface of the memory elements 80 is coated and thereby allows for printing thereon.

The manufacturing method of this embodiment discussed above gives the printing paper 70 where the memory elements 80 having the storage of the printing information are arranged on the upper left corner and the lower right corner. The technique of this embodiment sets the cutting positions based on the detected positions of the memory elements 80, thus ensuring the accurate cutting.

The memory elements 80 are arranged on the upper left corner and the lower right corner in the printing paper 70 of the embodiment. The memory element 80 may alternatively be arranged on an upper right corner and a lower left corner, may be arranged on all the four corners, the upper left, the upper right, the lower left, and the lower right, or may be arranged on only one of these four corners. As in the case of a printing paper 70B of a modified example shown in FIG. 5, the memory elements 80 may be arranged at random on the surface of the printing paper. The printing paper 70B of this modified example is obtained according to a manufacturing process shown in FIG. 6. The modified manufacturing process disperses the memory elements 80, in which the printing information is written at step S20, into a coating agent (step S22), coats the surface of the paper with the coating agent containing the dispersed memory elements 80 (step S24), and cuts the coated paper into a preset paper size (step S26). This completes the printing paper 70B of the modified example. The manufacturing process of the printing paper 70B in the modified example coats the paper with the coating agent containing the dispersed memory elements 80, thereby producing the printing paper 70B with the memory elements 80 arranged at random.

The printing paper 70 of the embodiment has the memory elements 80 fixed to the surface thereof by means of the coating agent. Another suitable agent may be used for fixation of the memory elements 80 to the paper. The memory elements 80 may be embedded inside the paper, instead of being attached to the surface of the paper. In this embedding case, the surface of the paper may be coated or may not be coated.

The printing paper 70 of the embodiment is constructed to transmit the printing information stored in the memory cell 85 from the antenna 82 via the signal analyzer RF 84, when receiving the radio wave with the specified signal set to urge transmission of the printing information. The printing paper 70 may alternatively be constructed to transmit the printing information stored in the memory cell 85 from the antenna 82 via the signal analyzer RF 84, when simply receiving radio wave of a predetermined wavelength.

Figure 7:
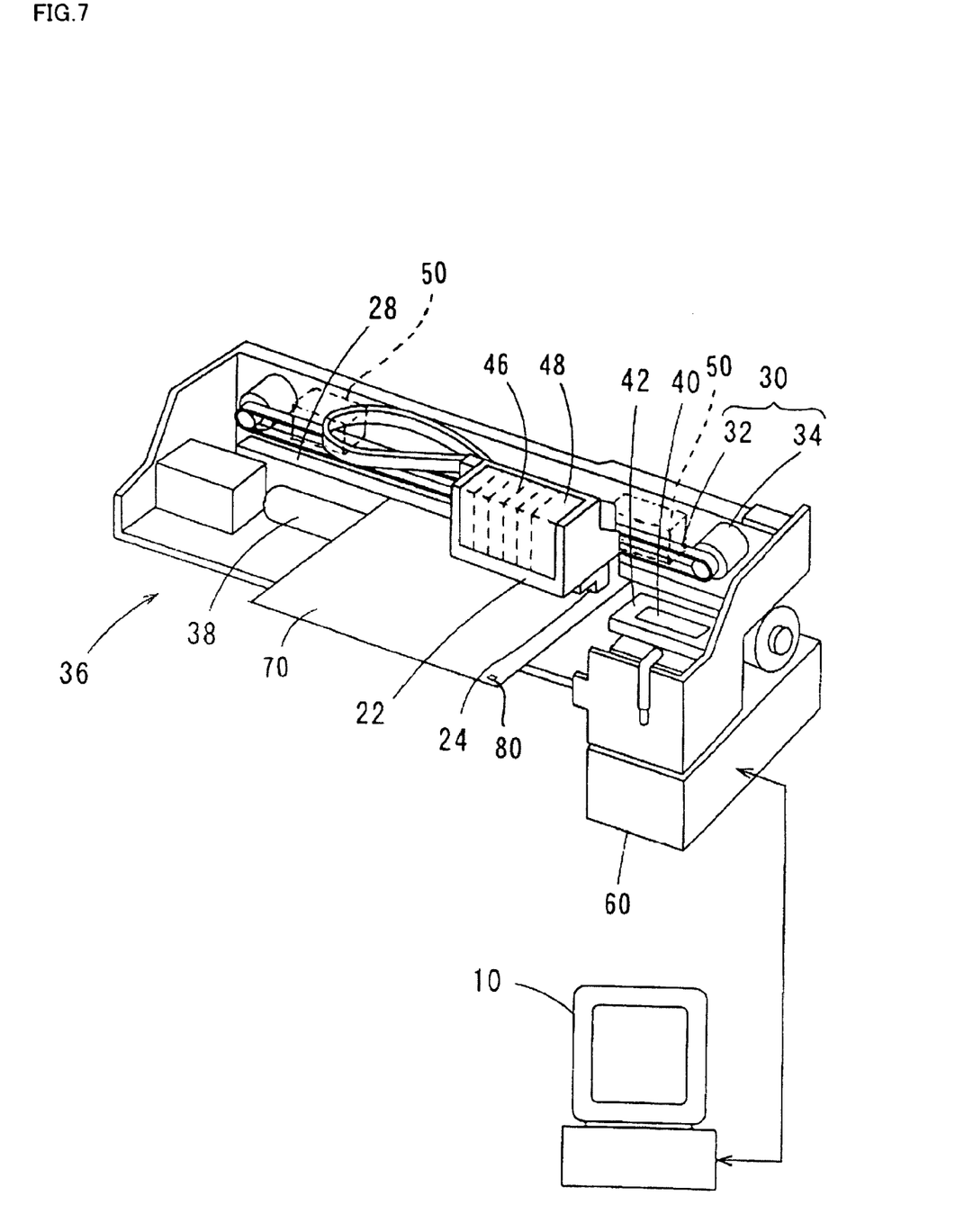
FIG. 7 schematically illustrates the construction of a printer 20 as a printing apparatus in one embodiment of the present invention.

A printing apparatus is discussed below as one embodiment of the present invention. FIG. 7 schematically illustrates the construction of a printer 20 as a printing apparatus in one embodiment of the present invention. As illustrated, the printer 20 of this embodiment is connected with a computer 10, and receives a printing instruction output from, for example, an application program running on the computer 10. A printer driver incorporated in the operating system of the computer 10 converts print data representing an image or a document into color data of respective inks used in the printer 20 and transfers the converted print data. The printer 20 prints the image or the document on the printing paper 70 of the embodiment shown in FIG. 1, based on the received print data.

As illustrated, the printer 20 has a carriage mechanism 30 including a carriage belt 32 and a carriage motor 34 to reciprocate a carriage 22, which has ink cartridges 46 and 48 mounted thereon and is guided by a guide member 28, from side to side in the drawing, and a sheet feed mechanism 36 that includes a sheet feed roller 38 and shifts the printing paper 70 back and forth in the drawing. The printer 20 also has a capping assembly 40 that closes nozzle openings of a print head 24 attached to the lower portion of the carriage 22 in rest conditions of the printing operation, and a wiping unit 42 that uses blades or equivalent elements to wipe the surface of the print head 24 and thereby clean off the ink residue and paper powder attached to the surface of the print head 24. The printer 20 further has two information collection units 50 that are disposed at left and right corners of the printing paper feeding system on the rear side of the carriage mechanism 30 and are used to gain the printing information from the memory elements 80 attached to the printing paper being fed, and a controller 60 that controls the whole printer 20.

Figure 8:
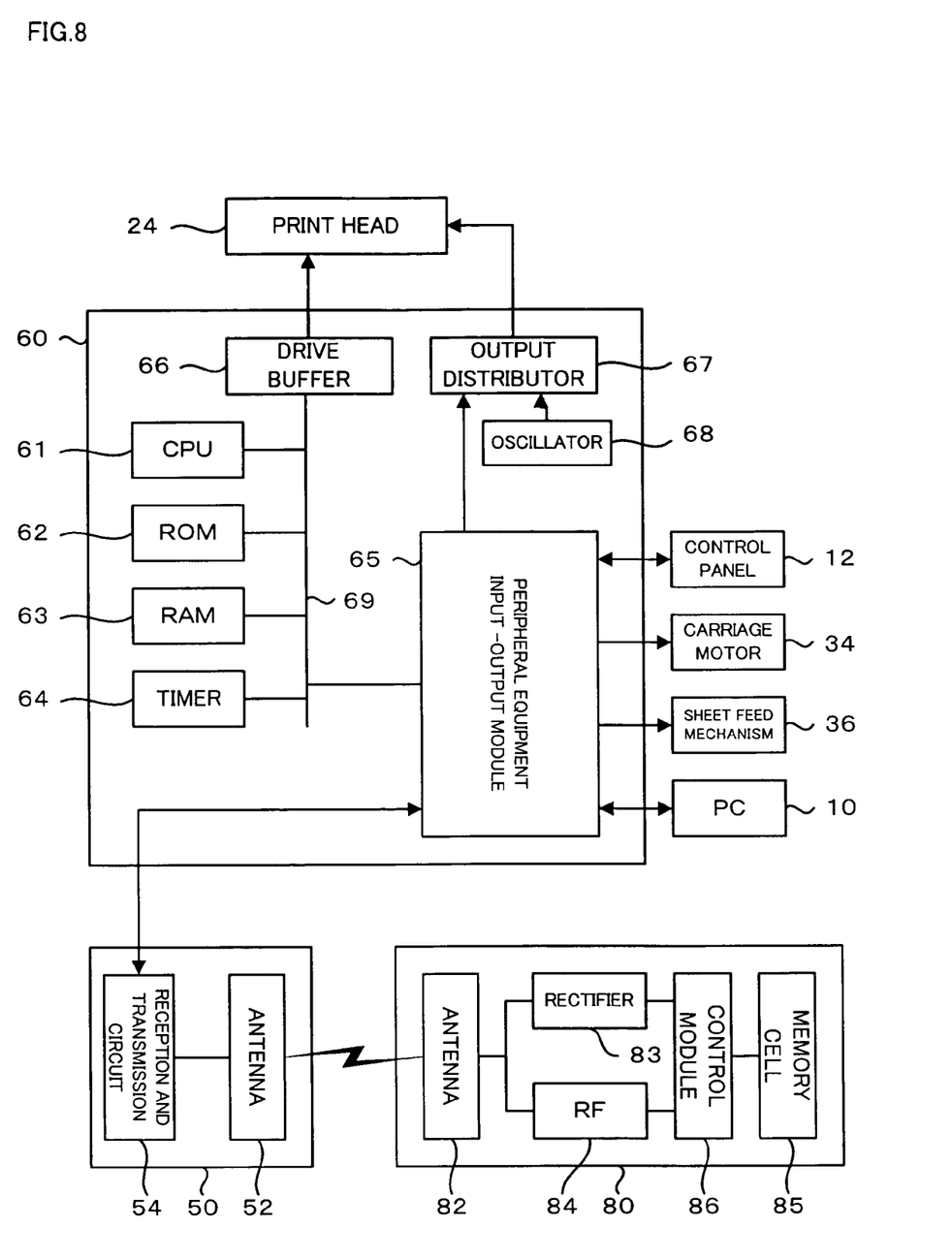
FIG. 8 is a block diagram showing an electrical connection between the printer 20 of the embodiment and the memory element 80 of the printing paper 70 in the form of functional blocks.

FIG. 8 is a block diagram showing an electrical connection between the printer 20 of the embodiment and the memory element 80 of the printing paper 70 in the form of functional blocks. The two information collection units 50 have an identical structure, so that one is omitted from the illustration of FIG. 8. The information collection unit 50 includes an antenna 52 constructed as a micro-strip antenna and a reception and transmission circuit 54 that receives and transmits signals by radio wave of a preset wavelength (for example, radio wave in a frequency band of 2.45 GHz) via the antenna 52 in response to instructions from the controller 60. The controller 60 is constructed as a microprocessor including a CPU 61, a ROM 62 that stores processing programs and various data, a RAM 63 that temporarily stores data, a timer 64 that counts time, a peripheral equipment input-output module 65 that takes charge of input and output of signals from and to peripheral equipment, a drive buffer 66 that supplies on-off signals for dot formation to the print head 24, an oscillator 68 that outputs driving waveforms at a predetermined frequency, and an output distributor 67 that distributes the output from the oscillator 68 to the print head 24 at preset timings. The CPU 61, the ROM 62, the RAM 63, the timer 64, and the peripheral equipment input-output module 65 are mutually connected via a bus 69. The peripheral equipment input-output module 65 inputs setting signals from a control panel 12 used for diverse settings, control signals from the computer 10, and received data from the reception and transmission circuits 54 of the information collection units 50. The peripheral equipment input-output module 65 outputs display signals to the control panel 12, driving signals to the carriage motor 34, driving signals to the sheet feed mechanism 36, control signals to the computer 10, and transmission signals to the reception and transmission circuits 54 of the information collection units 50. The structure of the memory element 80 of the printing paper 70 has been discussed previously.

Figure 9:
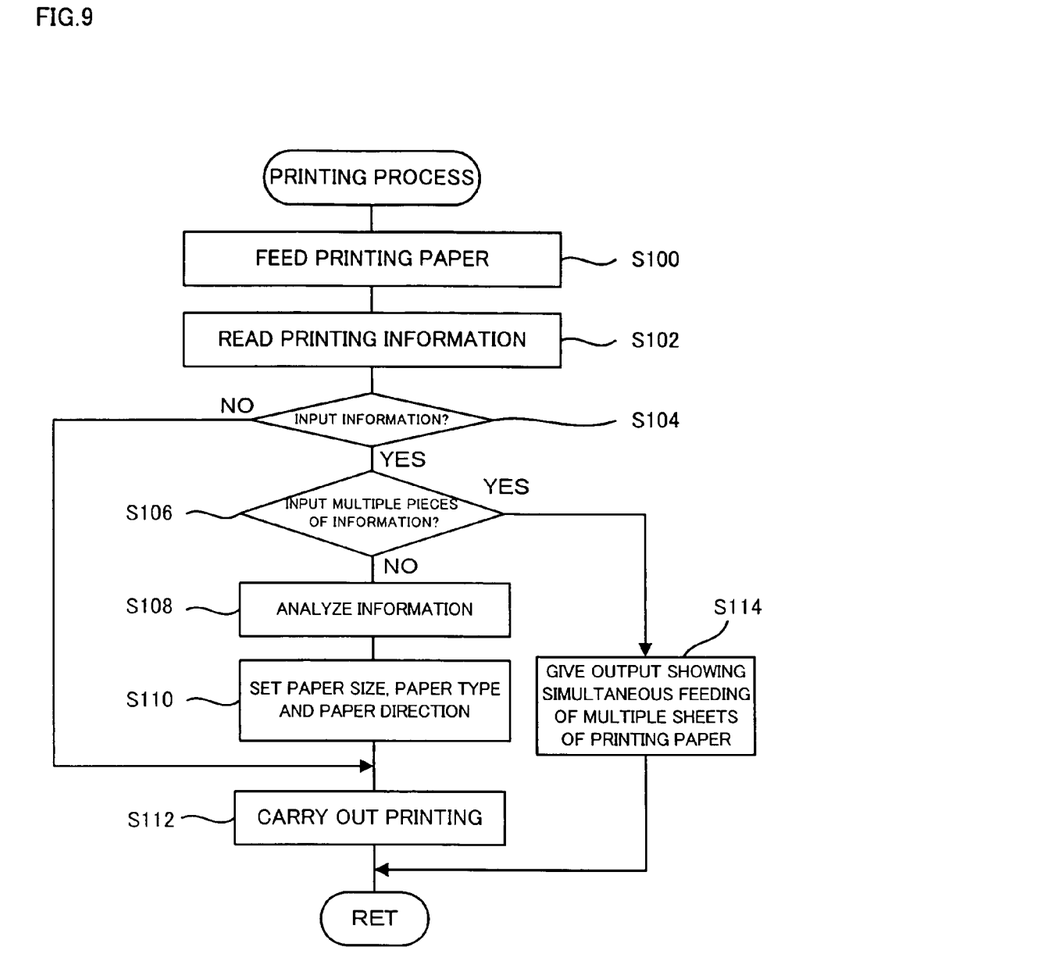
FIG. 9 is a flowchart showing one printing process executed by the controller 60.

The printer 20 of the embodiment thus constructed works as discussed below. FIG. 9 is a flowchart showing one printing process executed by the controller 60. This printing routine is executed in response to an instruction of executing a print job. The printing process first activates the sheet feed mechanism 36 to feed the printing paper 70 to a printable position and reads the printing information from the memory element 80 attached to the printing paper 70 in the course of feeding (steps S100 and S102). The concrete procedure of reading the printing information causes the specified signal, which is set in advance to urge transmission of the printing information, to be transmitted on the radio wave of the preset wavelength from the antenna 52 to the reception and transmission circuit 54 of the information collection unit 50 via the peripheral equipment input-output module 65, and activates the reception and transmission circuit 54 to receive and input the printing information transmitted from the antenna 82 of the memory element 80 via the antenna 52 in response to the specified signal.

The printing process subsequently determines whether or not the printing information has been read by this printing information reading procedure (step S104). The printer 20 of the embodiment is capable of using printing papers other than the printing paper 70 with the memory elements 80, that is, standard printing papers without the memory elements 80, for printing. The determination of whether or not the printing information has been read thus represents the determination of whether or not the printing paper set in the printer 20 is the printing paper 70 with the memory elements 80. When no printing information has been read, the printing process determines that not the printing paper 70 with the memory elements 80 but a standard printing paper is set in the printer 20 and prints a printing object on the standard printing paper (step S112). The printing process is then terminated.

When the printing information has been read, on the other hand, the printing process subsequently determines whether or not multiple pieces of the printing information have been read (step S106). One sheet of the printing paper 70 is generally fed at once. Two or more sheets of the printing paper 70 may, however, be fed simultaneously, for example, due to electrostatic effects. In the case where multiple sheets of the printing paper 70 are fed, the procedure of step S102 reads multiple pieces of the printing information. Determination of whether or not multiple pieces of the printing information have been read thus represents determination of whether only one sheet of the printing paper 70 has been fed normally or multiple sheets of the printing paper 70 have been fed simultaneously. When reading multiple pieces of the printing information, the printing process determines that multiple sheets of the printing paper 70 have been fed simultaneously and lights up a non-illustrated lamp on the control panel 12 or outputs a signal to open an alarm window showing simultaneous feeding of multiple sheets of the printing paper 70 on the computer 10 (step S114). The printing process is then terminated.

When multiple pieces of the printing information have not been read, that is, when only one sheet of the printing paper 70 has been fed normally, the printing process analyzes the paper size, the paper type, and the paper setting direction from the read-in printing information (step S108). The printing process subsequently sets the analyzed paper size, paper type, and paper setting direction as printing conditions (step S110) and prints a printing object on the printing paper 70 under the settings of the printing conditions (step S112). The printing process is then terminated. Here the paper size and the paper type are directly analyzed, based on the printing information read from the memory element 80. Analysis of the paper setting direction, either portrait or landscape, is based on which of the two information collection units 50 attached to the printer 20 has read the printing information. As shown in FIG. 2, the memory elements 80 are arranged at the predetermined positions on the upper left corner and the lower right corner of the printing paper 70. When the right-side information collection unit 50 in FIG. 7 has read the printing information, the paper setting direction is 'portrait'. When the left-side information collection unit 50 in FIG. 7 has read the printing information, the paper setting direction is 'landscape'.

When the printing paper 70 with the memory elements 80 for storing the printing information including the paper size and the paper type attached to the predetermined positions on the upper left corner and the lower right corner is used for printing, the printer 20 of the embodiment sets the printing conditions including the paper size and the paper type, based on the printing information read from the memory element 80 and carries out printing under the settings of the printing conditions. This ensures printing with the optimum settings for the printing paper 70. This arrangement does not require any specific operations of the user to attain the optimum settings for the printing paper 70. The arrangement of using the two information collection units 50 allows for specification of the setting direction of the printing paper 70, either portrait or landscape.

The printer 20 of the embodiment carries out the printing information reading operation to determine whether or not multiple pieces of the printing information have been read, so as to detect that multiple sheets of the printing paper 70 have been fed simultaneously. In the case where multiple sheet of the printing paper 70 have been fed simultaneously, the non-illustrated lamp is lit up on the control panel 12 or the alarm window showing simultaneous feeding of multiple sheets of the printing paper 70 is open on the computer 10. This arrangement thus effectively informs the user of simultaneous feeding of multiple sheets of the printing paper 70.

The printer 20 of the embodiment terminates the printing process, when detecting the simultaneous feeding of multiple sheets of the printing paper 70. In such cases, one possible modification may make the printing process returned to the printing paper feeding operation of step S100 after feed out of the multiple sheets of the printing paper 70. This modified arrangement enables the printing process to continue.

The printer 20 of the embodiment carries out the printing information reading operation to determine whether or not multiple pieces of the printing information have been read, so as to detect whether multiple sheets of the printing paper 70 have been fed simultaneously. Another possible modification may not carry out the determination of whether or not multiple sheets of the printing paper 70 have been fed simultaneously.

The printer 20 of the embodiment has the two information collection units 50 to specify the setting direction of the printing paper 70. If specification of the setting direction of the printing paper 70 is not required, the printer 20 may have only one information collection unit 50. In this modified structure, the information collection unit 50 may be located at the right-side position in FIG. 7, at the left-side position in FIG. 7, or at a middle position. The location of the information collection unit 50 may be determined according to the intensity of the radio wave transmitted from the antenna 52, the intensity of the radio wave transmitted from the antenna 82 of the memory element 80, and the sensitivity of the antenna 52 that receives the radio wave.

Figure 5:
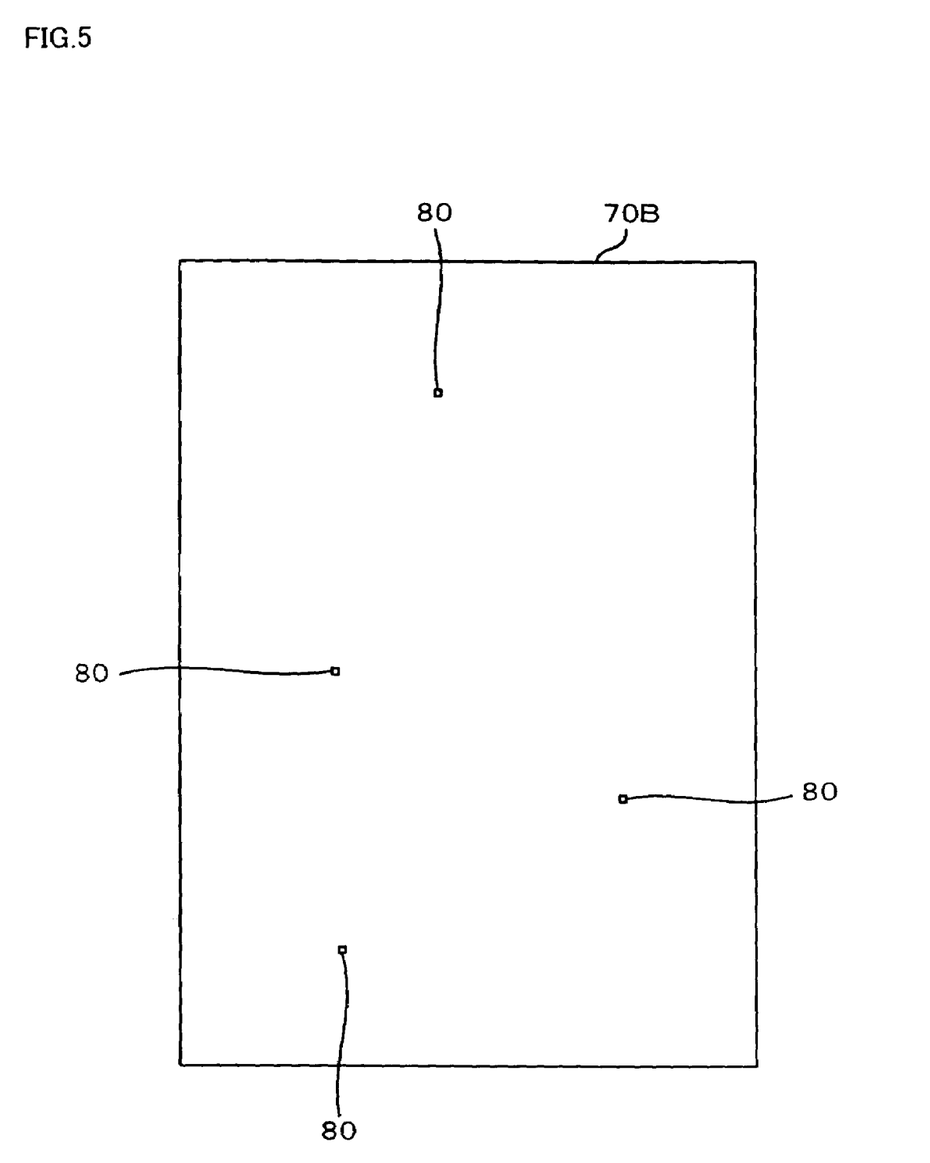
FIG. 5 schematically illustrates the structure of a printing paper 70B in a modified example.
Figure 6:
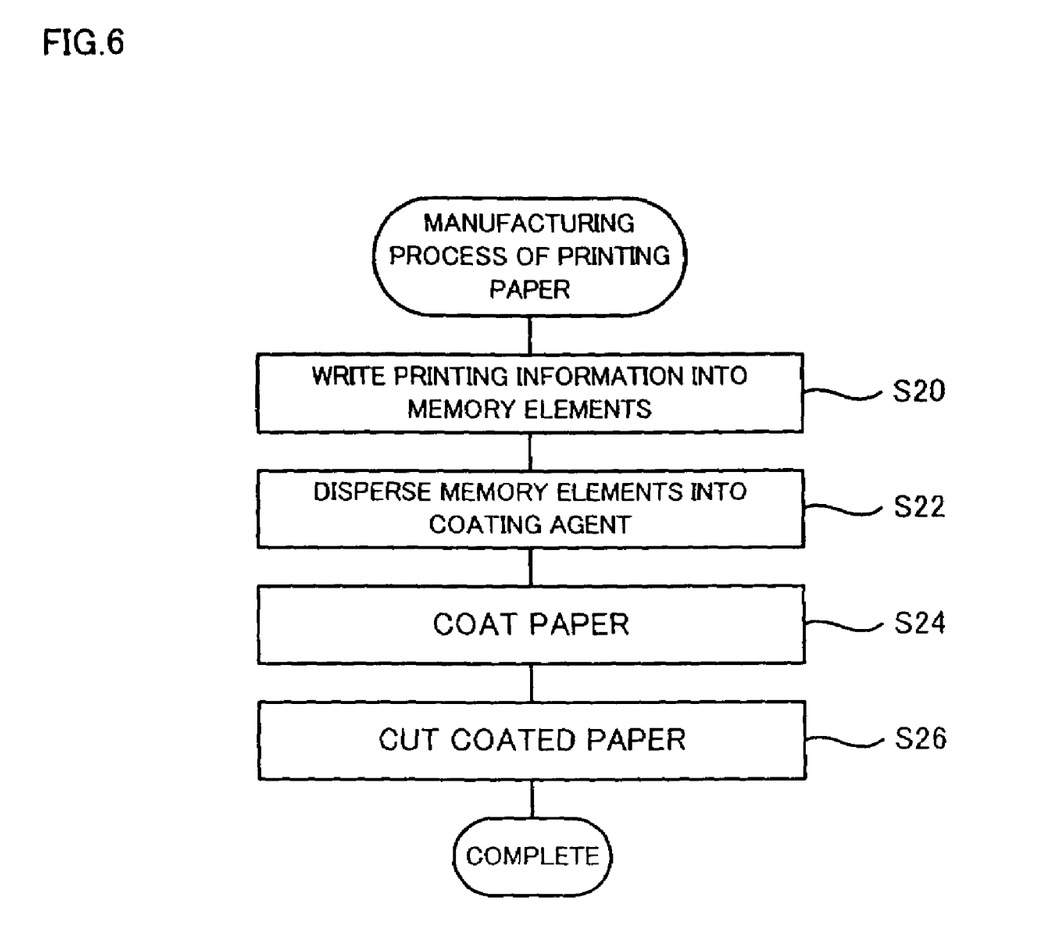
FIG. 6 is a flowchart showing one manufacturing process of the printing paper 70 in a modified example.

The printer 20 of the embodiment uses the printing paper 70 with the memory elements 80 for storing the printing information including the paper size and the paper type attached to the predetermined positions on the upper left corner and the lower right corner. The printer 20 of the embodiment may alternatively use a printing paper with the memory elements 80 attached to the upper right corner and the lower left corner, a printing paper with the memory elements 80 attached to all the four corners, the upper left, the upper right, the lower left, and the lower right, or a printing paper with the memory element 80 attached to only one of these four corners. The printer 20 of the embodiment may also use the printing paper 70B with the memory elements 80 arranged at random on the surface as shown in FIG. 5. In these cases, the location of the information collection unit 50 may be determined according to the intensity of the radio wave transmitted from the antenna 52, the intensity of the radio wave transmitted from the antenna 82 of the memory element 80, and the sensitivity of the antenna 52 that receives the radio wave.

In the printer 20 of the embodiment, the specified signal set to urge transmission of the printing information is carried on the radio wave and is transmitted from the information collection unit 50, in order to acquire the printing information. In one possible modification, the memory element 80 may be constructed to transmit the printing information stored in the memory cell 85 from the antenna 82 via the signal analyzer RF 84, when receiving radio wave of a preset wavelength. In this case, the information collection unit 50 is required to simply transmit the radio wave of the preset wavelength.

The above embodiments are to be considered in all aspects as illustrative and not restrictive. There may be many modifications, changes, and alterations without departing from the scope or sprit of the main characteristics of the present invention. All the changes within the meaning and range of equivalency of the claims are therefore intended to be embraced therein.

What is claimed is:

1. A printing paper used for printing, said printing paper comprising:
   a memory element that is formed to a thin film of a predetermined thickness, is disposed on surface or inside of said printing paper, and stores printing information used for printing,
   wherein said memory element comprises: a storage module that stores the printing information, a reception module that receives a first transmission wave, a transmission module that transmits a second transmission wave, and a control module that has control to cause the printing information stored in the storage module to be carried on the second transmission wave and to be transmitted from the transmission module, in response to reception of the first transmission wave.

2. A printing paper in accordance with claim 1, wherein said memory element is arranged at a preset position of said printing paper.

3. A printing paper in accordance with claim 1, wherein said memory element is disposed on at least one of a lower right corner and an upper left corner on the surface of said printing paper.

4. A printing paper in accordance with claim 1, wherein said memory element is arranged at random on the surface of said printing paper.

5. A printing paper in accordance with claim 1, wherein said memory element is interposed between the surface of said printing paper and a coating agent, which is used to coat the surface of said printing paper.

6. A printing paper in accordance with claim 1, wherein the printing information includes paper-related information regarding said printing paper.

7. A printing paper in accordance with claim 1, wherein the printing information includes settings-related information regarding settings in a printing apparatus, which carries out printing with said printing paper.

8. A printing paper in accordance with claim 1, wherein the control module has control to make the second transmission wave transmitted from the transmission module by utilizing energy of the received first transmission wave.

9. A printing paper in accordance with claim 1, wherein said memory element is formed to have a thickness of not greater than 0.2 mm.

10. A printing paper in accordance with claim 1, wherein said memory element is formed to a rectangular shape having each side of not greater than 0.5 mm.

11. A method of manufacturing a printing paper, said manufacturing method comprising the steps of:
   (a) storing printing information, which is used for printing, into memory elements, each of which is formed to a thin film of a predetermined thickness;
   (b) arranging said memory elements with the printing information stored therein at preset positions on a paper; and
   (c) coating surface of the paper with said memory elements arranged thereon,
   wherein said step (a) stores the printing information into said memory elements, each of which comprises: a storage module that stores the printing information, a reception module that receives a first transmission wave, a transmission module that transmits a second transmission wave, and a control module that has control to cause the printing information stored in the storage module to be carried on the second transmission wave and to be transmitted from the transmission module, in response to reception of the first transmission wave.

12. A manufacturing method in accordance with claim 11, said manufacturing method further comprising the step of:
   cutting the coated paper into a predetermined shape according to the positions of said memory elements, after said step (c).

13. A manufacturing method in accordance with claim 11, wherein said step (a) stores the printing information into said memory elements, each of which is formed to have a thickness of not greater than 0.2 mm.

14. A manufacturing method in accordance with claim 11, wherein said step (a) stores the printing information into said memory elements, each of which is formed to a rectangular shape having each side of not greater than 0.5 mm.

15. A method of manufacturing a printing paper, said manufacturing method comprising the steps of:
   (a) storing printing information, which is used for printing, into memory elements, each of which is formed to a thin film of a predetermined thickness;
   (b) dispersing said memory elements with the printing information stored therein into a coating agent; and
   (c) coating a paper with the coating agent of said dispersed memory elements,
   wherein said step (a) stores the printing information into said memory elements, each of which comprises: a storage module that stores the printing information, a reception module that receives a first transmission wave, a transmission module that transmits a second transmission wave, and a control module that has control to cause the printing information stored in the storage module to be carried on the second transmission wave and to be transmitted from the transmission module, in response to reception of the first transmission wave.

16. A manufacturing method in accordance with claim 15, wherein said step (a) stores the printing information into said memory elements, each of which is formed to have a thickness of not greater than 0.2 mm.

17. A manufacturing method in accordance with claim 15, wherein said step (a) stores the printing information into said memory elements, each of which is formed to a rectangular shape having each side of not greater than 0.5 mm.

18. A printing apparatus that prints a printing object including characters, letters, symbols, or an image on a printing paper, said printing apparatus comprising:
   a feeding module that feeds said printing paper, which is set at a paper setting position, for printing;
   a printing information collection module that, while said printing paper having a memory element for storing printing information used for printing is fed by said feeding module, acquires the printing information from said memory element of said printing paper; and
   a printing module that prints the printing object on said printing paper, based on the acquired printing information, wherein:
   said memory element comprises: a storage module that stores the printing information; a reception module that receives a first transmission wave; a transmission module that transmits a second transmission wave; and a control module that has control to cause the printing information stored in the storage module to be carried on the second transmission wave and to be transmitted from the transmission module, in response to reception of the first transmission wave, and
   said printing information collection module comprises: a transmission module that transmits the first transmission wave; a reception module that receives the second transmission wave; and an analyzer module that analyzes the printing information carried on the received second transmission wave.

19. A printing apparatus in accordance with claim 18, wherein the printing information includes paper-related information regarding said printing paper, and
   said printing module prints the printing object with settings required for printing, based on the paper-related information included in the acquired printing information.

20. A printing apparatus in accordance with claim 19, wherein said printing paper has said memory element arranged at a preset position,
   the paper-related information includes a paper size,
   said printing information collection module detects the position of said memory element on said printing paper in the course of feeding and acquires the printing information from said detected memory element, and
   said printing module prints the printing object with settings of a size and a direction of said printing paper, based on the paper size and the detected position of said memory element on said printing paper in the course of feeding.

21. A printing apparatus in accordance with claim 19, wherein the paper-related information includes a paper type, and
   said printing module prints the printing object with settings suitable for the paper type.

22. A printing apparatus in accordance with claim 18, wherein the printing information includes settings-related information regarding settings of said printing apparatus, and
   said printing module prints the printing object with settings required for printing, based on the settings-related information included in the acquired printing information.

23. A printing apparatus in accordance with claim 18, said printing apparatus further comprising:
   a specific output module that gives a specific output, when multiple pieces of the printing information are acquired simultaneously by said printing information collection module.

24. A printing apparatus in accordance with claim 23, wherein said specific output module gives the specific output representing simultaneous feeding of multiple sheets of said printing paper.

25. A printing apparatus in accordance with claim 18, wherein said memory element is formed to have a thickness of not greater than 0.2 mm.

26. A printing apparatus in accordance with claim 18, wherein said memory element is formed to a rectangular shape having each side of not greater than 0.5 mm.

27. A printing apparatus in accordance with claim 18, wherein said memory element is interposed between surface of said printing paper and a coating agent, which is used to coat the surface of said printing paper.

28. A printing method that prints a printing object including characters, letters, symbols, or an image on a printing paper, said printing method comprising the steps of:
(a) while said printing paper that has a memory element for storing printing information used for printing and is set at a paper setting position is fed for printing, acquiring the printing information from said memory element of said printing paper; and
(b) printing the printing object on said printing paper, based on the acquired printing information,
wherein said step (a) acquiring the printing information from said memory element, said memory element comprises: a storage module that stores the printing information, a reception module that receives a first transmission wave, a transmission module that transmits a second transmission wave, and a control module that has control to cause the printing information stored in the storage module to be carried on the second transmission wave and to be transmitted from the transmission module, in response to reception of the first transmission wave.

29. A printing method in accordance with claim 28, wherein the printing information includes paper-related information regarding said printing paper, and said step (b) prints the printing object with settings required for printing, based on the paper-related information included in the acquired printing information.

30. A printing method in accordance with claim 29, wherein said printing paper has said memory element arranged at a preset position,
the paper-related information includes a paper size,
said step (a) detects the position of said memory element on said printing paper in the course of feeding, and
said step (b) prints the printing object with settings of a size and a direction of said printing paper, based on the paper size and the detected position of said memory element on said printing paper in the course of feeding.

31. A printing method in accordance with claim 29, wherein the paper-related information includes a paper type, and said step (b) prints the printing object with settings suitable for the paper type.

32. A printing method in accordance with claim 28, wherein the printing information includes settings-related information regarding settings of said printing apparatus, and
said step (b) prints the printing object with settings required for printing, based on the settings-related information included in the acquired printing information.

33. A printing method in accordance with claim 28, wherein said step (a) gives a specific output, when multiple pieces of the printing information are acquired simultaneously.

34. A printing method in accordance with claim 28, wherein said step (a) gives the specific output representing simultaneous feeding of multiple sheets of said printing paper.

* * * * *